2 Sheets—Sheet 1.
R. DUTTON.
Harvester.
No. 1,762.
Reissued Sept. 13, 1864.
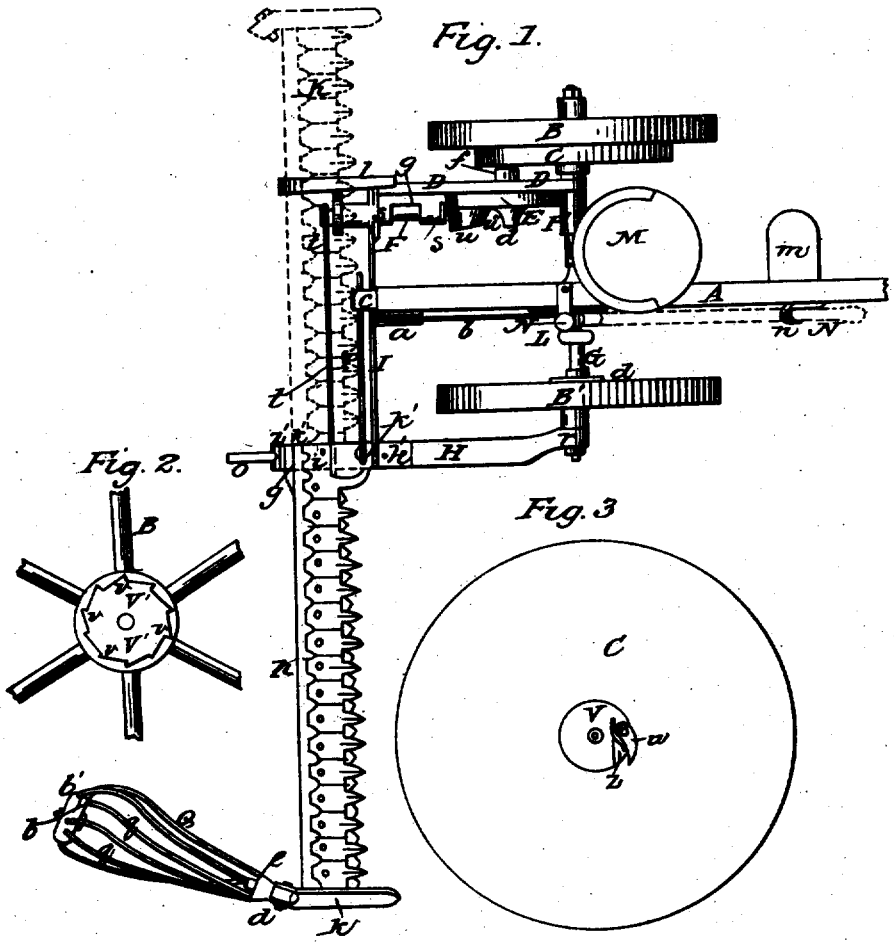
Witnesses:
John A. Faulconschmidt,
John T. C. Brennan
Inventor:
Rufus Dutton
By James Densmore
Agent.
N. PETERS, Photo-Lithographer, Washington, D. C.

R. DUTTON.

2 Sheets—Sheet 2.

Harvester.

No. 1,762.

Reissued Sept. 13, 1864.

Witnesses:
John A. Dauberschmidt,
John T. E. Prentiss.

Rufus Dutton,
By James Densmore
Agent.

N. PETERS, Photo-Lithographer, Washington, D. C.

UNITED STATES PATENT OFFICE.

RUFUS DUTTON, OF BROOKLYN, NEW YORK.

IMPROVEMENT IN HARVESTERS.

Specification forming part of Letters Patent No. 31,705, dated March 19, 1861; Reissue No. 1,762, dated September 13, 1864.

*To all whom it may concern:*

Be it known that I, RUFUS DUTTON, of Brooklyn, Kings county, State of New York, formerly of Dayton, State of Ohio, have invented a new and useful Improvement in Mowing or Harvesting Machines; and I do hereby declare that the following is a full, clear, and exact description thereof, reference being had to the accompanying drawings, and to the letters of reference marked thereon, and making a part of this specification.

The nature of my invention consists in so constructing the casing which receives and protects the "secondary" gearing, so called, of the machine that such casing shall furnish the bearings of such secondary gear, and so that the frame shall form a part of such casing, and in an improved construction of pawl and ratchet for coupling and uncoupling the driving and gear wheel, and also in an improved track-clearer.

Figure 1 is a plan view of the machine, showing the position of the casing and one form of construction thereof. Fig. 2 is a view of a portion of the main driving-wheel detached, looking from the inside and showing the ratchet in the hub of such wheel. Fig. 3 is a view of the outside of the main gear-wheel detached, and showing the pawl and spring by which it is coupled with the main driving-wheel.

Like letters designate corresponding parts in all the figures.

Figure 4:
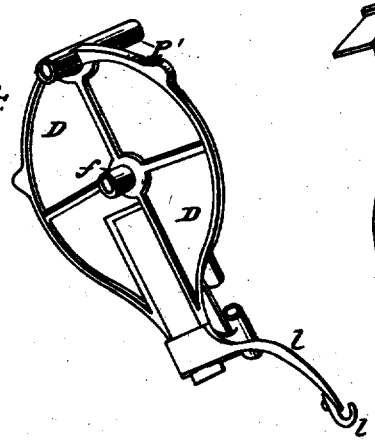
Figure 5:
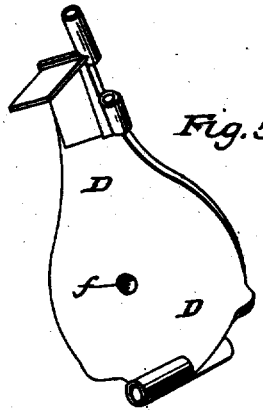
Figure 9:
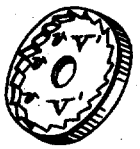
Figure 8:
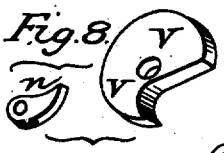
Figure 6:
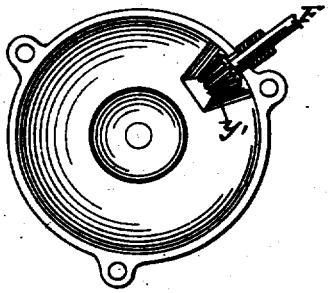
Figure 7:
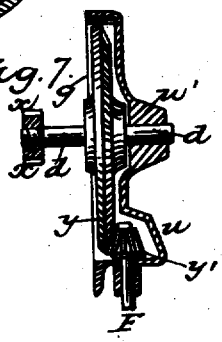

In the drawings, A represents the tongue of the machine; B B′, the driving-wheels; C, the main gear-wheel, and G the axle on which they are mounted. The main driving-wheel C, which actuates the working parts of the machine, is situated close to the left or outer driving-wheel, B, and is coupled with such wheel by means of a pawl and ratchet so arranged that as the machine is moved forward the driving-wheel and main gear-wheel are coupled together; but as the machine is moved backward they will be uncoupled. The arrangement of such pawl and ratchet is as follows: On the inner face of the hub of the wheel B is a concentric recess, the periphery of which is formed into ratchet-teeth *v v v*, as shown in Fig. 3, and on the center of the outside of the main gear-wheel C is a concentric projection, V, Fig. 4, corresponding with such recess in the hub of the wheel B and fitting therein, and in the outer portion of such projection V, in a recess prepared for such purpose, is pivoted a pawl, *w*, the point of which projects outwardly far enough to engage with the ratchet-teeth *v v*, and which is held in such outward position by means of a spring, Z. The pawl *w* is so arranged with respect to the recess in which it is placed that the base or broad end of such pawl rests against and is supported by such recess instead of being supported by the pivot passing through such pawl, such pivot serving only as a guide or pin on which the pawl turns. The part of such recess receiving the base of such pawl is a portion of a circle the center of which is the pin on which the pawl turns, and the radius of which is equal to the distance from the center of such pin to the curved end of such pawl. The face of the projection V and of the pawl are usually in the same plane. By this arrangement of having the pawl *w* placed in a recess provided for it and supported by such recess, instead of having such pawl held and supported by a pin only, the pawl is protected against liability of displacement from its proper position, and there is no danger of the pin on which the pawl turns or works becoming loosened or broken, which occurs very frequently when the pawl has no other support than the pin passing through it, and when such pin must receive and bear all the strain or pressure to which the pawl may be subjected. When the pawl is so placed in a recess, even should the pin passing through it become broken or wholly separated from the part to which it is fastened, the pawl would still retain its position and perform, though perhaps less perfectly, its required functions. The driving-wheel B′ is in like manner provided with a ratchet-recess similar to that of the main driving-wheel B, in which engages the pawl of a flange, *d′*, Fig. 1, rigidly secured to the axle. It is desirable that the left or outer driving-wheel, B, should do most of the work in driving the axle; but in turning corners, where such driving-wheel has not much motion, and in passing over inequalities of the ground, where such wheel might not have much traction, it is necesssry to have the opposite wheel, B′, also coupled with the axle.

For the purpose of equalizing the draft of the machine, and for the other purposes hereinafter mentioned, the main gear-wheel *c* and the secondary gearing that gives vibration to the cutter-bar are placed on the same side of the machine with and near the main driving-wheel B. By this arrangement the gear-wheel, being situated at the extremity of the axle opposite the finger-bar, its weight, which is considerable, has a tendency to equalize the draft. Other advantages are also secured by placing such main gear-wheel in close proximity to the main driving-wheel, and coupling them together, as described. When the gear-wheel is situated near the middle of the axle it is liable to strike obstructions in its path; but this objection is obviated to a great degree by placing it at one end. There is also considerable saving in the cost, for when the gear-wheel is situated away from the main driving-wheel a flange similar to the flange *d'* must be used to couple the main driving-wheel to the axle.

At a suitable position inside the main gear-wheel *c* there is secured to the axle G, by means of an eye or socket, P', the outer side, D, of the frame of the machine, and to the extremity of the axle, outside of the driving-wheel B', is secured the inner side, H, of the frame, the connection between this side and the axle being by an eye or socket, *r*, in which the axle turns. The sides D and H extend back, and are connected by means of the back piece, I, of the frame, which piece I is to be sufficiently elevated to pass over the grass. The outside D of the frame is a metallic plate of suitable size for the purpose designed, and on its outer surface, at the proper position, is cast a bearing, *f*, for the reception of the counter-shaft *d'* of the pinion and bevel-wheel, which receive their motion direct from the main driving-wheel *c*, the bearing *f* forming a portion of the plate D, and consequently, being always at the proper distance from the axle of the driving-wheels, keeps the pinion of the counter-shaft passing through it constantly in the proper position to mesh with the teeth of the main gear-wheel C. To the inner side of such plate or part D is fitted a casing-box, E, inclosing between it and the part D the beveled or secondary gearing above referred to, a projecting center of said casing-box, as shown in Fig. 1, forming a bearing for the inner end of the counter-shaft *d*. Another projection, U, of suitable size and shape, is formed on the rear side of such casing-box E to receive the bevel-pinion on the end of the pitman or crank-shaft F, and which gears into the beveled wheel on the counter-shaft *d*. These two parts D and E together make or form an inclosing casing to hold and protect the secondary gear before referred to. The bevel-wheel and pinion, being inclosed in such casing so formed by the plate or frame D and the part E, are protected against grass, dirt, or any other extraneous substance having a tendency to choke or wear them. As these are, however, most likely to become choked or be interfered with from grass and other matter entering from below, it is more necessary that such casing should be close and tight on the under or bottom side, and it may be less tight and close, or partially open on the upper side. It is preferable, however, to have the casing inclosing such beveled and gear wheels complete and continuous on every side. The drawings represent such casing-box formed on one side by the plate or side of the frame D and on the other side by the part E, placed side by side, and meeting and fixed together in a vertical plane; but it is evident that such casing may be made of two parts—an upper and lower—divided horizontally in a plane passing through the bearings of the counter and crank shaft, the lower part of such box or casing cast with or made a part of the frame of the machine, and in which may be the bearings for the counter-shaft *d*, and the upper parts setting upon and fastening to the lower part. The ends attained by such construction of casing-box—namely, that it shall furnish the bearings of the counter-shaft, thus rendering unnecessary separate and additional bearings for such shaft, and rendering the machine both lighter and cheaper, and also protecting the secondary gearing from grass, dirt, &c.—will be as effectually secured in one form of construction as in the other. By making the bearings of the counter-shaft *d* in such casing such shaft will better keep its position, and separate bearings are rendered unnecessary.

On the rear end of the plate or part D is a metallic piece, *g'*, having bearings *s s* for the pitman or crank shaft F, the two sides of which are at right angles and fit to and rigidly embrace the corner formed by the side D and the back piece, I, of the frame. The back I being bent around and bolted to the plate or part D, and also to the metallic piece *g'*, the opposite or inner end of the back I is curved or turned downward on the inner side, H, of the frame, and rigidly secured thereto, as shown at *h'*. This back piece, I, thus situated in front of the pitman-crank, protects it from obstruction, and avoids the necessity of shielding it. The inner side, H, of the frame extends behind the junction of the back piece, I, therewith, and underneath the hinge-piece *i* of the finger-bar the extremity thereof is turned up and forms a lug or ear, *z'*, to which a similar lug or ear, *k*, of said hinge-piece *i* is jointed by means of a pivot, *q*. The lug *k*, on the opposite end of the hinge-piece *i*, is in like manner jointed by means of a pivot, *h*, to the back piece, I, of the frame. These two pivots are on a line with each other, so that the finger-bar K is easily folded over on the rear end of the frame whenever it is desirable, for the purpose of convenience, in taking the machine from place to place. For sustaining the finger-bar when thus folded over a support, *l*, extends from the plate or side D of the frame to which it is bolted, as represented. By this arrangement, making the inner side, H, of the frame form the shoe of the finger-bar, resting on the ground and hinging the finger-bar so as to allow its inne end to rise and fall, such finger-bar can adapt itself to the inequalities of the ground in mowing.

The finger-bar is raised, lowered, and controlled by the operator while sitting in the driver's seat M by means of a lever, N, fitting into a segment, L, turning on the axle G, and from which segment extends a rope or chain passing over a pulley, *a*, and connected with the back piece, I, of the frame. As the lever N is thrown forward the rear end of the frame, including the finger-bar, will be elevated. To raise the outer end of the finger-bar when it is extended, there is placed on the pivot *h* of the hinge-piece *i* a lever, P, which can turn freely outward toward the finger-bar, but is prevented from turning independently in the other direction by striking the hinge-piece *i*. This lever is turned inward, so as to extend beyond the tongue A, against or under the end of which it strikes as the lever N is thrown forward, and is thus pressed down, and consequently elevates the end of the finger-bar.

The manner of raising and lowering the finger-bar and the operation of elevating the outer end of such bar are more fully described in other reissued Letters Patent of even date herewith.

To throw the mown grass away from the standing grass as the machine passes along, I employ a track-clearer, Q, arranged at an acute angle with the finger-bar, as represented. This track-clearer is of conical form, the apex being situated toward the finger-bar, and the body thereof is made of metallic wires or rods, usually about one-fourth of an inch thick, arranged in a spiral manner. The ends of these wires or rods next the finger-bar are inserted in a conical block, *c'*, which turns on the bolt of a hinge-socket, *d'*, joined to the rear of the outer shoe, *k*, of the finger-bar, and the opposite ends of said wires or rods are secured between two weight-clamps, *b' b'*, which are provided with grooves to receive them. The weight-clamps are secured firmly together by means of a bolt and nut, and they are made of such weight as to give the body of the track-clearer sufficient traction with the ground to cause it to rotate. Thus arranged, the hinged socket *d'* allows the track-clearer to adapt itself to the inequalities of the ground, and the body of the track-clearer, being composed of spiral wires or rods and situated at an acute angle with the finger-bar, receives a rotary motion by being drawn along. The cut grass passing over the finger-bar, falling on said track-clearer, is thrown away from the standing grass in an effective manner. The arrangement is very simple, cheap, and superior to anything of the kind heretofore used, the spiral rods, in connection with the clamp-weights, giving it a more effective and steady rotary motion.

What I claim as my invention, and desire to secure by Letters Patent, is—

1. Constructing the casing of the secondary gearing, substantially as described, so that such casing shall not only receive and protect such gear from grass, dirt, &c., but shall also form or furnish the bearings of the center shaft of such gear, substantially as and for the purposes set forth.

2. The conical skeleton track-clearer formed of spiral rods or wires, when connected at their outer ends by weighted clamps, substantially as described.

R. DUTTON.

Witnesses:
S. D. LAW,
ALONZO C. FARNHAM.